(12) United States Patent
Yagawa

(10) Patent No.: US 7,177,883 B2
(45) Date of Patent: Feb. 13, 2007

(54) METHOD AND APPARATUS FOR HIERARCHICAL STORAGE MANAGEMENT BASED ON DATA VALUE AND USER INTEREST

(75) Inventor: Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/891,511

(22) Filed: Jul. 15, 2004

(65) Prior Publication Data

US 2006/0015529 A1 Jan. 19, 2006

(51) Int. Cl.
*G06F 17/00* (2006.01)
(52) U.S. Cl. .......................... 707/104.1; 707/2; 707/10
(58) Field of Classification Search ............. 707/104.1, 707/2, 10
See application file for complete search history.

(56) References Cited

U.S. PATENT DOCUMENTS

| | | | | |
|---|---|---|---|---|
| 4,430,701 | A * | 2/1984 | Christian et al. | 711/119 |
| 5,537,585 | A | 7/1996 | Blickenstaff et al. | |
| 5,557,790 | A * | 9/1996 | Bingham et al. | 707/101 |
| 5,784,646 | A * | 7/1998 | Sawada | 710/38 |
| 5,847,708 | A * | 12/1998 | Wolff | 715/764 |
| 5,881,311 | A | 3/1999 | Woods | |
| 6,032,224 | A * | 2/2000 | Blumenau | 711/117 |
| 6,181,336 | B1 * | 1/2001 | Chiu et al. | 715/736 |
| 6,311,252 | B1 * | 10/2001 | Raz | 711/117 |
| 6,330,572 | B1 * | 12/2001 | Sitka | 707/205 |
| 6,804,719 | B1 * | 10/2004 | Cabrera et al. | 709/226 |
| 6,832,248 | B1 * | 12/2004 | Byrnes | 709/223 |
| 6,850,955 | B2 | 2/2005 | Sonoda et al. | |
| 2002/0065910 | A1 * | 5/2002 | Dutta | 709/224 |
| 2002/0069280 | A1 * | 6/2002 | Bolik et al. | 709/225 |
| 2002/0069324 | A1 | 6/2002 | Gerasimov et al. | |
| 2002/0083120 | A1 | 6/2002 | Soltis | |
| 2002/0161855 | A1 * | 10/2002 | Manczak et al. | 709/219 |
| 2003/0028695 | A1 * | 2/2003 | Burns et al. | 710/200 |

(Continued)

OTHER PUBLICATIONS

Shankar et al., "Building and Supporting a Massive Data Infrastructure for the Masses", Nov. 20-23, 2002, ACM, pp. 134-138.*

(Continued)

*Primary Examiner*—Don Wong
*Assistant Examiner*—Michael Le
(74) *Attorney, Agent, or Firm*—Reed Smith LLP; Stanley P. Fisher, Esq.; Juan Carlos A. Marquez, Esq.

(57) ABSTRACT

A hierarchical storage data management system includes application servers, a metadata server interconnected with the application servers through a local area network, storage devices interconnected through data flow paths, and a storage network connecting the storage devices to the application servers and to the metadata server. The metadata server including a metadata management element, a data value management unit, and a hierarchical storage management element calculates a data value for each of stores data objects in the system, assigns a storage cost value for each of storage areas in the system, normalizes calculated data values and assigned storage costs to an identical value range, compares normalized data values with normalized storage costs thereby determining whether to relocate the data objects to different storage areas, and relocates data objects to storage areas with storage cost values identical with data values of the data objects.

24 Claims, 13 Drawing Sheets

U.S. PATENT DOCUMENTS

2003/0078946 A1\* 4/2003 Costello et al. ............ 707/201
2003/0140207 A1 7/2003 Nagase et al.
2004/0039891 A1 2/2004 Leung et al.
2004/0098363 A1 5/2004 Anglin et al.

OTHER PUBLICATIONS

IEEE, "The Authoritative Dictionary of IEEE Standards Terms", 2000, Standards Information Network, 7th Edition, p. 744.\*

"Rain Technology, Reliable Array of Independent Nodes: A Layer 3 Clustering Platform for Mission-Critical Internet applications", Rainfinity, Fall 2001, 8 pages.

"Lightning 9900™ V Series", Hitachi Data Systems, Hitachi Freedom Storage Software, Technical Specifications—Comparison Chart (2003), 3 pages.

Rain Technology, "Reliable Array of Independent Nodes: A Layer 3 Clustering Platform for Mission-Critical Internet Applications", Fall 2001, pp. 1-8.

Rain Technology, "Reliable Array of Independent Nodes: A Layer 3 Clustering Platform for Mission-Critical Internet Applications Categories", http://www.rainfinity.com/products/wp_rain.html, pp. 1-5, (2002).

Storage Networking Industry Association, "OSD Technical Work Group", 2002, http://www.snia.org/tech_activities/workgroups/osd pp. 1-3.

\* cited by examiner

FIG. 5

| Data Object ID | Data Object Name | Storage ID | Address In Storage | Flag | ----- | |
|---|---|---|---|---|---|---|
| 1 | Xxx | T2 | 300 | Open | ----- | ~561 |
| 2 | Yyy | T3 | 1000 | Open | ----- | ~562 |
| 3 | Zzz | T1 | 200 | Read | ----- | ~563 |
| --- | --- | --- | --- | --- | ----- | |

| Data Object ID (651) | Data Object Profiles (652) | Access Record (653) | Data Value (654) | |
|---|---|---|---|---|
| 1 | A, B, C, D, E, F | 4 | 4 | ~661 |
| 2 | G, I, K, L, N, P, Q | 0 | 12 | ~662 |
| 3 | K, L, M, N, O, P, Q | 16 | 18 | ~663 |
| --- | --- | --- | --- | |
| n | G, H, I, J, K, L | 10 | 14 | ~66n |
| --- | --- | --- | --- | |

| Profile Parameter | Index to Data Object | Point |
|---|---|---|
| A | 1 | 4 | ~781
| B | 1 | 4 | ~782
| --- | --- | --- |
| L | 2, 3, n | 26 | ~783
| M | 3 | 16 | ~784
| --- | | |

| Storage ID | Address Area | Storage Area Value | ----- | |
|---|---|---|---|---|
| T1 | 1 – 100 | 10 | ----- | ~ 861 |
| T1 | 101 – 200 | 9 | ----- | ~ 862 |
| --- | --- | --- | ----- | |
| T2 | 1 – 200 | 7 | ----- | ~ 863 |
| T2 | 201 – 400 | 6 | ----- | ~ 864 |
| --- | --- | --- | ----- | |
| T3 | 1 – 1000 | 3 | ----- | ~ 865 |
| T3 | 1001 – 2000 | 2 | ----- | ~ 866 |
| --- | --- | --- | ----- | |

| Data Object ID 981 | Data Value 982 | Normalized Data Value 983 | Storage ID 984 | Address in Storage 985 | Storage Area Value 986 | Appropriate Storage Cost 987 | Relocation Required 988 |
|---|---|---|---|---|---|---|---|
| 1 | 4 | 2 | T2 | 300 | 6 | 2 | YES |
| 2 | 12 | 6 | T3 | 1000 | 2 | 6 | YES |
| 3 | 18 | 9 | T1 | 200 | 9 | 9 | NO |
| ... | ... | | ... | ... | ... | | |

150

METHOD AND APPARATUS FOR HIERARCHICAL STORAGE MANAGEMENT BASED ON DATA VALUE AND USER INTEREST

BACKGROUND OF THE INVENTION

1. Field of the Invention

The present invention relates to data storage and management methods and systems. More particularly, the present invention relates to methods and systems for hierarchical storage management, data management and arrangement into storage resources based upon a specific set of pre-selected parameters.

2. Related Art

As businesses expand in data volume and diversity, organizations must manage escalated physical quantity of data storage, demand for universal access to information, growing complexity of storage environments, and adoption of emerging technologies. Very few companies have unlimited resources or time to address these challenges. Today, companies have to consider new storage management strategies based on high performance, intelligent systems, and sophisticated software that enable the management of existing data and existing networks while maximizing uptime and reducing the cost of data storage.

Hierarchical storage management is a method for managing large amounts of data. Files/data are assigned to various storage media based on how soon or how frequently they will be needed. The main characteristics of data are evaluated by the storage system. Data is managed based on one or a plurality of those characteristics, such as time interval, frequency of use and/or value. The user's interest is also evaluated based on the same main characteristics. Data is managed according to users' interest during the data's lifecycle. Data can also be arranged into appropriate storage resources depending on storage costs.

The management of data during its lifecycle is a challenging task. The main challenge relies in how to manage very large volumes of data, that are increasing constantly, and at the same time to control the cost associated with data management while preserving very low Total Cost of Ownership (TCO).

The basic requirements for successful management of storage systems, that have been identified within the presently available technologies for managing and storing large volumes of data within the desired budget, are to posses fully scalable architectures and to provide data management services at minimal costs. The fully scalable architecture does not limit the capacity of storage systems and the management range performed by a data management software pertaining to a storage area network integrated within the hardware architecture. Minimal TCO can be achieved by performing minimal administration tasks.

Object Based Storage Devices (OSD) and Reliable Array of Independent Nodes (RAIN) are examples of storage system architectures that aim at fully scalable data management.

Minimal TCO was achieved, in a traditional way, by managing data storage via Hierarchical Storage Management (HSM) systems. HSM systems allow the management of data files among a variety of data storage media. One challenge the HSM systems faces is that involved media differ in access time, capacity, and cost such that they are hardly to be integratively managed. For example, short-term storage media, such as magnetic disks that can be arranged as a redundant array of independent disks (RAID), have different parameters from any other components within the network such that they need to be managed separately. HSMs provide an interim solution by providing automatic performance tuning for storage therefore eliminating performance bottlenecks. Currently, the technology behind HSM systems involves preserving the access frequency for each data volume and analyzing their access pattern. It also involves normalizing the access ratio to the storage subsystem by migrating logical volumes within the storage. One example of current HSM systems is CruiseControl® included in Hitachi Lightning 9900™ V product series, that are widely available today.

OSD and RAIN architectures are examples of fully scalable architectures which need additional technologies besides hierarchical storage data management to achieve and maintain minimal TCO in managing data. If a company regularly adds identical storage systems to expand storage capabilities (for example, online storage devices), as the data volume grows, very high costs are incurred due to the regular addition of storage capacities. As storage capacity rapidly reaches its limits, the company cannot minimize its TCO.

Another aspect to consider is that data has its own value, which varies through its lifecycle. There is a need for architectures containing different types of storage devices and media and managing data depending on its value and lifecycle. Data is stored in the appropriate places, depending on its values. It is important to provide a system which automatically defines where data should be stored, by considering both data values and storage costs.

The traditional HSM technologies do not take into consideration changes in data's value through its lifecycle. Currently, users define data lifecycle management proceedings statically, before archiving, and data is stored in different types of storage media based on predefined parameters. For example, when the predefined lifetime of certain stored data expires in a RAID system, the system simply archives the data into a tape. However, the value of data varying through its lifecycle also depends on the users' interest that varies from time to time. If users want to change the value of data during its lifecycle, they have to manage it manually and with additional management costs.

There is a need for methods and systems for hierarchical storage management that take into consideration the data's value based on users' interest through the data's lifecycle, and then arrange the data into appropriate storage resources based upon the data's value and storage costs.

There is also a need for methods and systems for hierarchical storage management that allow fully scalable architectures, such as OSD and RAIN, to manage data through their lifecycle with minimal TCOs.

BRIEF DESCRIPTION OF THE INVENTION

The embodiments of the present invention address these needs by providing a hierarchical data storage management that takes into consideration the data's value based on user interest through its lifecycle. Data is arranged into the appropriate storage resources based on assessed values and on storage costs. The invention provides for scalable network architectures to manage data volumes with minimal costs.

A hierarchical data management apparatus, comprises a plurality of application servers, a metadata server, wherein the plurality of application servers and the metadata server are interconnected through a local area network, a storage area network, and a plurality of storage devices, wherein the storage area network connects the plurality of storage devices to the plurality of application servers and to the metadata server, and the plurality of storage devices are interconnected through a plurality of data flow paths. The method for performing hierarchical data storage management comprises issuing a data access command from the data access client element to the metadata server, issuing an acknowledgement of receipt from the metadata server, issuing metadata from the metadata management element, forwarding data access records from the metadata management element to the data value management unit, calculating a value for each data, retaining the calculated value in a data values table, forwarding a set of data values to the hierarchical storage management module, on request-basis, planing the metadata adjustment, executing the metadata adjustment, generating storage profile tables, managing the storage profiles tales, normalizing the data value and storage cost, accessing a plurality of storage devices, and asking for command execution.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The present invention will be described hereinbelow with reference to the accompanying drawings as follows:

FIG. 5 illustrates an example of a metadata table.

FIG. 6 illustrates an example of a data values table.

FIG. 7 shows an example of a user interest table.

FIG. 8 illustrates an example of a storage profiles table.

FIG. 9 illustrates an example of a joined table.

DETAILED DESCRIPTION OF THE INVENTION

In the following description of the preferred embodiments reference is made to the accompanying drawings which form a part thereof, and in which are shown by way of illustration specific embodiments in which the invention might be practiced. It is to be understood that other embodiments may be utilized and structural changes may be made without departing from the scope of the present invention.

Figure 1:
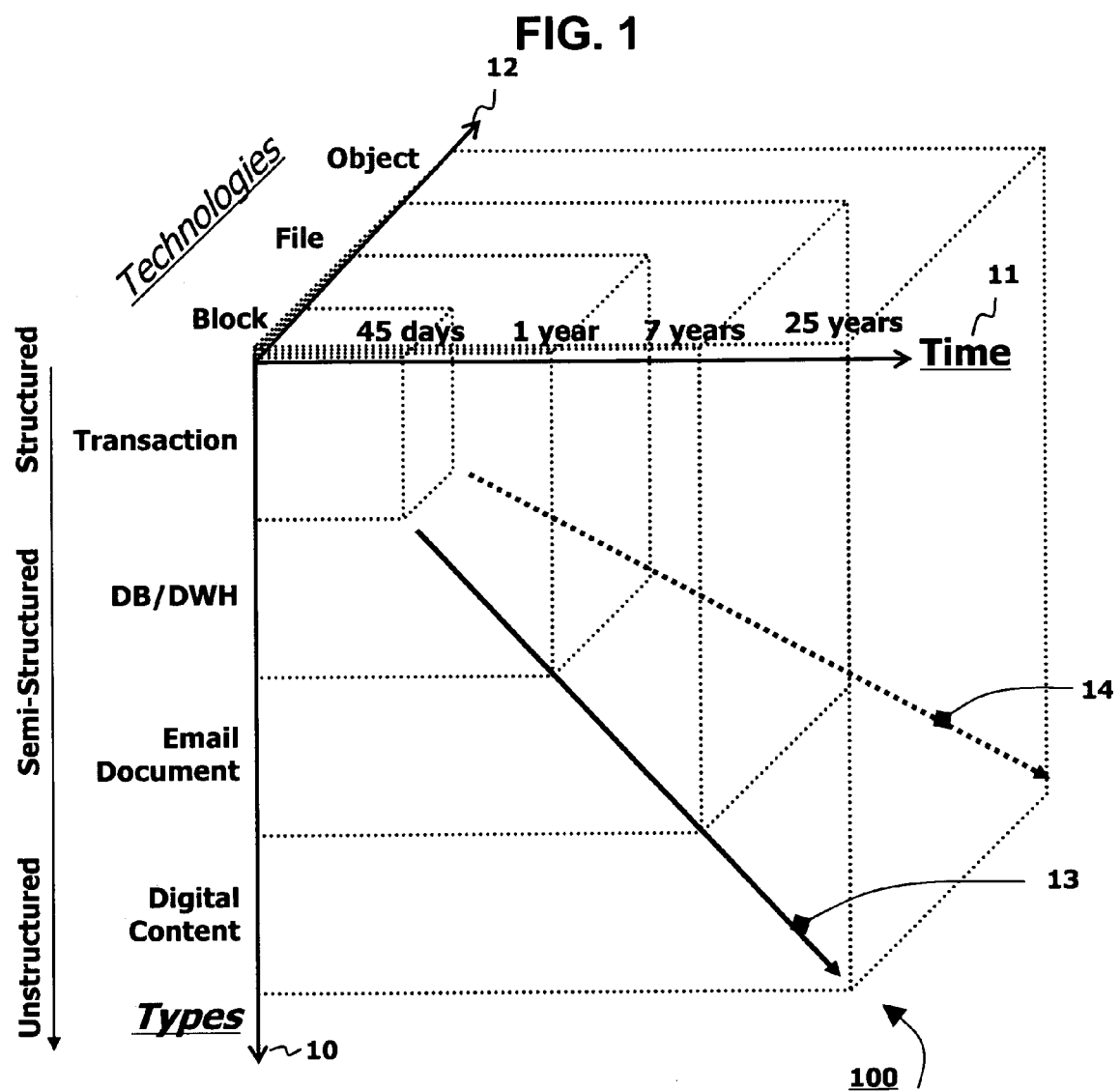
FIG. 1 illustrates a graph comprising data lifecycle management (DLCM) information.

FIG. 1 illustrates a graph comprising data lifecycle management (DLCM) information. An object is a data structure (incorporating data and methods) whose instance is unique and separate from other objects, although it can "communicate" with other objects. An object lifetime (or life cycle) in object-oriented programming is the time between an object's creation (also known as instantiation or construction) till the object is no longer used, and is freed. In the object-oriented programming, the lifetime of each object tends to vary more widely than in the case in conventional programming.

The graph 100, comprising data lifecycle management (DLCM) information comprises an X-axis 11, that indicates the preservation time for the managed data, an Y-axis 10 that indicates the types of data managed, and an Z-axis 12 that indicates the data management technologies employed. The preservation time for the data managed is measured in days and years. Examples of possible types of data include transaction data, Database/Data warehouse (DB/DWH) data, e-mail documents, digital content data, etc. Examples of data management technologies employed include block management, file management, object management, etc. Two major trends are observed in the chart 100: the types of data managed varying from structured data to semi-structured data and unstructured data, and the preservation times for the data managed increasing.

Examples of structured data include transactional data and DB/DWH. An example of the semi-structured data is E-mail, which consists of a structured part (the header) and an unstructured part (the e-mail's body). An example of unstructured data is digital content, whose data structure is not unique and is unpredictable. The existing storage systems can best manage the structured data than the semi-structured and unstructured data, and they are trying to expand their efficiency in handling the semi-structured and unstructured data.

There are several other reasons for increasing the preservation time for the managed data: governmental regulations imposed on companies to preserve data for a longer period of time thereby auditing their business activities, re-purpose of data, such as Data Mining, Business Intelligence, and so on. Therefore, better solutions for data management are demanded.

An arrow 13 (in a solid line) in FIG. 1 represents the market trends and indicates that the companies are challenged by the increased volume of data managed and, as a result, are worried about their Total Cost of Ownership for Enterprise Data (TCO-D). Therefore, managing data through their lifecycles becomes very critical for companies. From the point of view of storage service vendors, they could benefit and expand their markets if they provide and operate with appropriate technologies, such as Object Based Storage Devices along with Block Based Storage Area Network SAN and File Based Network Attached Storage Devices NAS. This market trend is illustrated by an arrow 14 (in a broken line) in FIG. 1.

As mentioned, the management of data during their lifecycle is challenging. Its main challenge relies in how to manage constantly increasing large volumes of data, and at the same time to control the associated costs to preserve very low TCOs.

The basic requirements for management and storage systems that attempt to manage large volumes of data and be within the desired cost parameters are: to posses fully scalable architectures and to provide data management services at minimal costs. The fully scalable architectures requirement means that there are no limitations regarding the capacity of storage systems. At the same time, no limitations regarding the management range performed by the data management software pertaining to the storage systems. Minimal TCOs can be achieved by performing minimal administration tasks.

Object Based Storage Devices (OSD) and Reliable Array of Independent Nodes (RAIN) are storage system architectures that currently aim at fully scalable data management.

Figure 2:
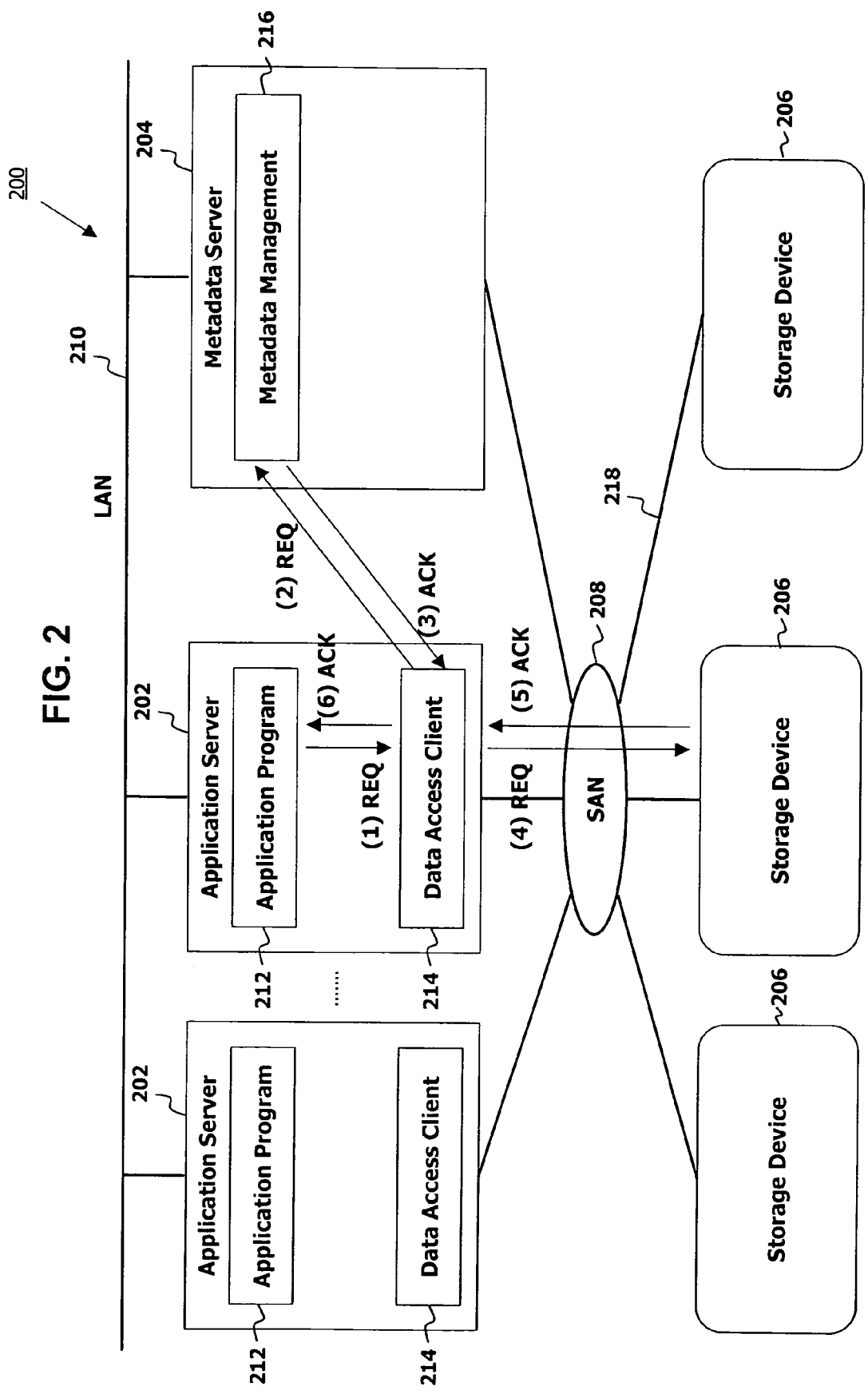
FIG. 2 illustrates a generic example for an object based storage device architecture (OSD).

FIG. 2 illustrates a generic example for Object Based Storage Device architecture (OSD). The architecture 200 includes a plurality of application servers 202, a metadata server 204, a plurality of storage devices 206, a storage area network (SAN) 208 and a local area network (LAN) 210. Each application server 202 comprises an application program element 212 and a data access element 214. The metadata server 204 contains a metadata management element 216. The application servers 202 are inter-connected through the local area network (LAN) 210. The application servers 202 access the storage devices 206 through the storage area network (SAN) 208. Between the SAN 208 and each of the storage devices 206, a link 218, either a logical or physical link, is established. There is no limitation regarding the number of application servers and storage devices connected in the architecture 200.

The metadata management element 216, pertaining to metadata server 204, controls, in a single, point-to-point flow, the data locations and their securities (metadata). The metadata management element 216 is also responsible for device management. After the plurality of application servers 202 receive information about a location of a particular datum, they directly access the storage devices 206. An exemplary sequence of access is described as follows.

The application program element 212 requests a data I/O process (1) REQ from the data access client element 214.

The data access client element 214 sends a request for a command (2) REQ and a data object ID to the metadata management element 216.

The metadata management element 216 examines the command request (2) REQ and returns an acknowledgement (3) ACK to the data access client element 214. The (3) ACK includes the address for the requested data object ID which indicates where the data resides.

The data access client element 214 proceeds to retrieve the data based on the address and sends the command to the proper storage device 206 as identified by the provided address.

The storage device 206 executes the command, retrieves the data and returns a completion acknowledgement (5) ACK to data access client 214.

The data access client element 214 returns the acknowledgement (6) ACK to the application program element 212.

OSDs are fully scalable. Additional storage devices or capabilities can be added to the architecture 200.

RAIN systems include independent and distributed storage devices (nodes). RAIN systems usually do not include a common directory or metadata server for data such that each node manages metadata only within the node and knows how to access other nodes. One example of relationship between nodes is the Parent-Children relationship, in which a parent node knows how to access the children nodes. If a node cannot find certain data item requested by a client within the node, it accesses other nodes, where the data might be found. A data item is a sequence of related characters which can be defined as the smallest logical unit of data that can be independently and meaningfully processed. The capacity of this network can be automatically expanded by adding new nodes.

One of the key technologies for both OSD and RAIN is managing access exclusively from several applications to several storage systems. The present invention does not focus on this technology, but adopts existing technologies and focuses on addressing the challenges previously described.

Example Environments

The present invention is directed to a method and apparatus of hierarchical data storage management in which a value is assigned to each data item based on user interest through data's lifecycle. The data is arranged into appropriate storage resources considering storage costs.

Figure 3:
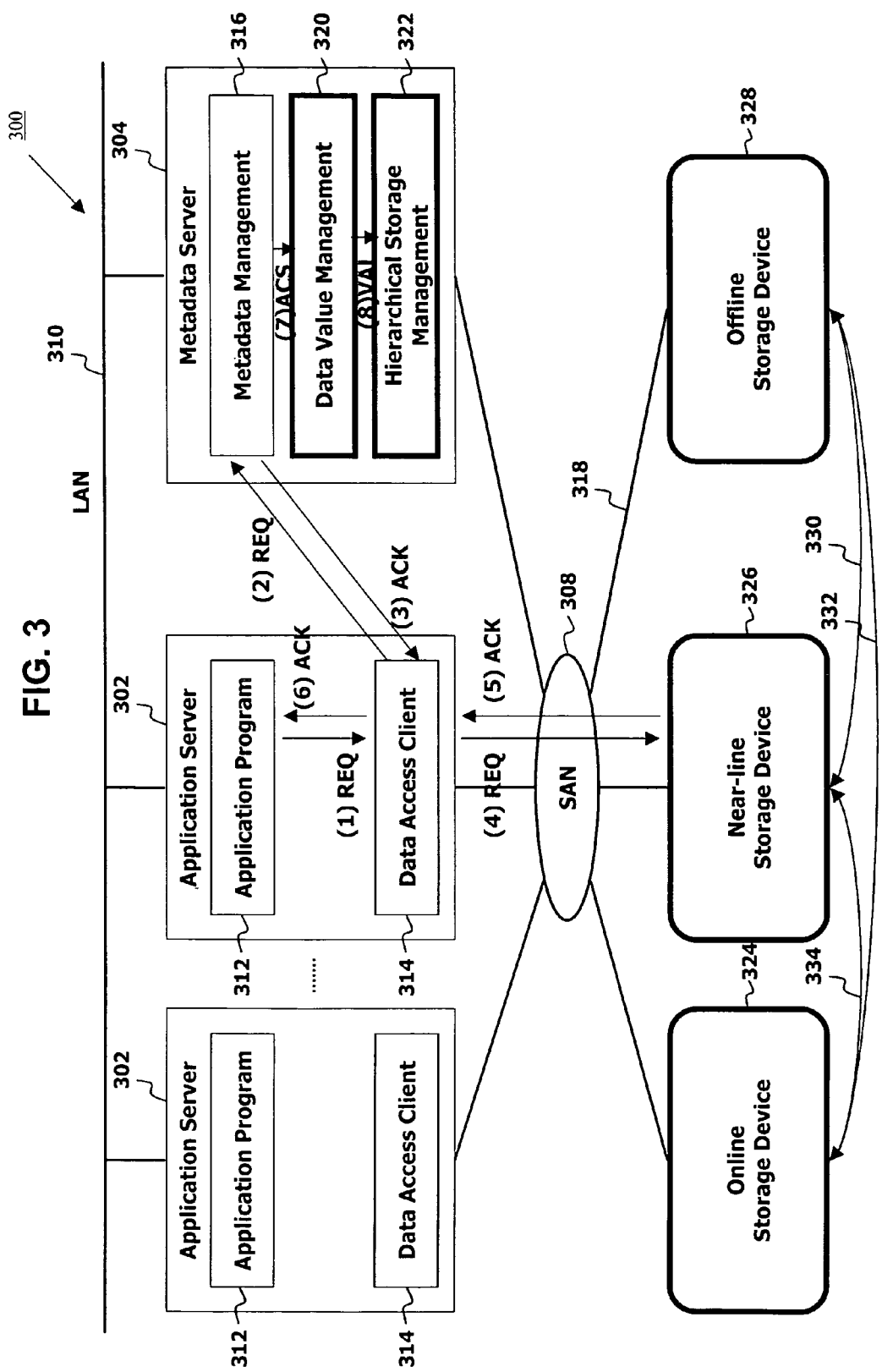
FIG. 3 illustrates an example of object based storage device architecture (OSD), in accordance with a first embodiment of the present invention.

FIG. 3 illustrates an example of an object based storage device architecture, in accordance with a first embodiment of the present invention.

The architecture 300 includes a plurality of application servers 302, a metadata server 304, a plurality of storage devices such as online storage devices 324, near-line storage devices 326, offline storage devices 328, a storage area network (SAN) 308, and a local area network (LAN) 310. Each application server 302 includes an application program element 312 and a data access client element 314. The metadata server 304 contains a metadata management element 316, a data value management element 320, and a hierarchical storage management element 322. The application servers 302 are interconnected among themselves and with the metadata server 304 through a local area network (LAN) 310. The application servers 302 access the storage devices 324, 326, and 328 through the storage area network (SAN) 308 and a plurality of links 318. The storage devices 324, 326, and 328 are interconnected through data flow paths 330, 332, and 334. There is no limitation regarding the number of application servers and storage devices connected in the architecture 300.

The metadata management element 316, pertaining to the metadata server 304, provides a single point-to-point flow control for data locations and their securities (Metadata). The metadata management element 316 is also responsible for device management. After the application servers 302 receive information about a location of a particular data item, they directly access the data item stored in one of the storage devices.

The differences between the architecture 200, illustrated by FIG. 2, and the architecture 300, illustrated by FIG. 3, are outlined hereinbelow.

The architecture 200 includes a plurality of storage devices that are all mono-type storage devices.

The architecture 300 includes different types of storage devices. The example environment provided in FIG. 3 shows three types of storage devices. The number of storage devices and their type are not limited to the example illustrated by the architecture 300. The architecture 300 includes the online storage device 324, the near-line storage device 326, and the offline storage device 328. The online storage device 324 is the most expensive one among the three, but provides the best performance. An example of the online storage system 324 is a RAID system using SCSI disks or Fibre Channel disks. The near-line storage devices 326 are not as expensive (usually cheaper than online storage devices), and provide moderately good performance. An example of a near-line storage device a RAID system using SATA disks. The offline storage devices 328 are usually the cheapest, but their performance is not good. While comprising different types of storage media, the architecture 300 provides a flexible and cost effective architecture.

As the volume of transactional data increasing, users can prepare and add additional online storage devices 324. For data to be archived and accessed only for considerably limited times in the future, users can prepare and add additional near-line storage devices 326, rather than any online storage devices 324, if the access to the archived data does not require the best performance. For data not to be accessed but archived anyway, the users can prepare and add additional offline storage devices 328.

The metadata server 304 includes two additional components, beyond what in the metadata server of the architecture 200: a data value management element 320 and a hierarchical storage management element 322.

The data value management element 320 assigns values to data based on the users' interest levels. The data value management element 320 receives data access records (7) ACS from the metadata management element 316, that indicate the latest interests from users, analyzes the access records (7) ACS, determines the users' interest at a certain time, and based on parameters, such as access frequency, lifetime in the storage, indexes, bibliographic information of a data object, or words extracted from the data object, to assign the data value (8) VAL.

The hierarchical storage management element 322 rearranges data based on their assigned values (8) VAL and storage profiles. Each storage profile contains features pertaining to storage, such as costs, performance results, etc. For example, the hierarchical storage management element 322 compares values of data and their costs of storage, and then rearranges the data in appropriate storage locations. A detailed description of the data flow will be explained in conjunction with FIG. 4. Generically, the data flow is illustrated in FIG. 3 by data flow arrows (1) through (8).

Figure 4:
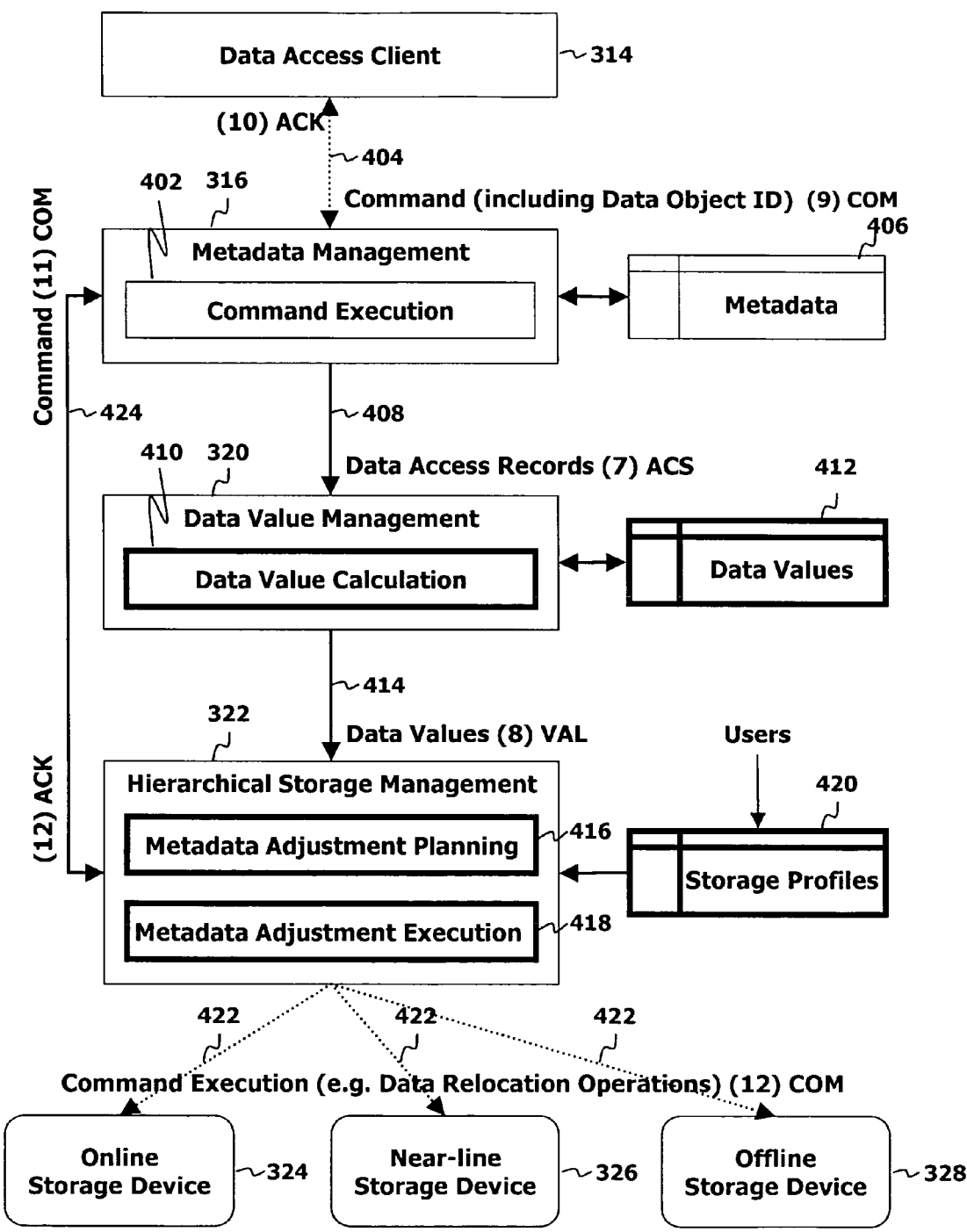
FIG. 4 illustrates a detailed block diagram for a hierarchical data management flow in accordance with the embodiment of the present invention depicted in FIG. 3.

FIG. 4 illustrates a detailed block diagram of the hierarchical data management flow in accordance with the present invention.

The data access client element 314 in the application server 302 sends a data access command (9) COM to the metadata server 316. In response, a set of results are delivered from the metadata server 316 to three components. The data access command (9) COM includes identification information for an to-be-accessed data object.

The metadata management element 316 in the metadata server 204 receives the command (9) COM from the data access client element 314 (which is realized through a data flow 404), interprets and executes the command (9) COM with a command execution element 402. Then, the metadata management element 316 returns an acknowledge (10) ACK to the data access client element 314. A unique function specific to the architecture 300 is to forward the data access records (7) ACS to the data value management element 320. The data access records (7) ACS are forwarded as a data flow 408.

The data value management element 320 in the metadata server 304 receives the data access records (7) ACS from the metadata management element 316, calculates the value for each data item, based on the access records (7) ACS and on users' interest, and retains the calculated values. Another unique feature of the architecture 300 is that a data value calculation module 410 thereof splits the data objects into individual profiles, calculates the individual value of each profile, and composes the individual value into data values (8) VAL. The set of values (8) VAL for individual profiles indicate the users' interest at a particular point in time. The data value management element 320 sends the set of data values (8) VAL to the hierarchical storage management element 322, per request. This is realized through a data flow 414.

The hierarchical storage management element 322 in the metadata server 304 receives the set of data values (8) VAL, plans the metadata adjustment to balance between data values and the respective storage profiles (e.g., storage costs) predefined by users, and adjusts the metadata. The users can directly confirm and modify the planned metadata adjustment and then instruct the execution of metadata adjustment. A metadata adjustment planning module 416 and a metadata adjustment execution module 418 are unique components of the architecture 300.

The hierarchical storage management element 322 computes the values of data based on users' interests, and rearranges data into appropriate storage resources, based on the costs for storage.

The hierarchical storage management element 322 further performs one additional function: managing a storage profiles table 420. The storage profiles table 420 contains information such as: profiles of storage, costs, etc. Customarily, these profiles are defined by the users through a user interface (not shown). This interface allows users to input the corresponding storage profiles.

In order to execute the metadata adjustment, the hierarchical storage management element 322 sends a data access command (11) COM via a flow 424 to the metadata management element 316. The metadata management element 316 issues an acknowledgement of receipt (12) ACK to the hierarchical storage management element 322. Subsequently, the hierarchical management element 322 accesses the appropriate storage device and asks for the execution of command (12) COM. Data flows 422 indicate this operational step. An example of a possible command is data relocation.

For security concerns, all tables managed by the metadata server 304 are stored in a special storage area accessible for authorized users but not other users.

FIG. 5 illustrates an example of a metadata table 406 referring back to FIG. 4. The metadata table 406 includes the following types of data in columns: data object ID 551, data object name 552, storage ID 553, address in storage 554, flag 555, and other features 556.

The column 551 indicates a data object ID for each data object therein, e.g., "2". The data object ID (DOID) is unique for the system deploying the architecture 300. The data access client elements 314 identify to-be-accessed data by DOIDs. The technology for maintaining the uniqueness of this parameter, within this heterogeneous environment, is fingerprinting or hashing. This technology is described by Arturo Crespo, Hector Garcia-Molina. in "*Awareness Services for Digital Libraries*", Research and Advanced Technology for Digital Libraries: First European Conference; proceedings/ECDL '97, Pisa, Italy, Sep. 1–3, 1997.

The column 552 indicates a data object name for each data object therein, e.g., "Yyy".

The column 553 indicates an unique storage ID for identifying the location where the data identified by the DOID is stored, e.g., "T3".

The column 554 indicates the unique address in the storage where the data identified by the DOID is stored, e.g., "1000". The combination of information contained in the columns 553 and 554 specifies the unique storage location within the whole system.

The column 555 indicates the current status/Flag of the data object, such as READ, WRITE, OPEN and so on. READ indicates that a data access client is reading the data object, WRITE indicates that a data access client is writing the data object, and OPEN indicates that there is no current access to the data object. In case of WRITE, the metadata management element 316 might reject concomitant access to the data object by other users to insure exclusive write access.

The column 556 comprises are other features that can be used to describe metadata, such as the size of data object, access control list (ACL) information, data profiles that describe the data object itself, and so on.

Rows 561 to 563 of the metadata table 406 are examples of metadata entries, identified by the above described parameters.

If a READ command is received, the metadata management device 316 receives the READ command and searches an entry in the metadata table 406, by using a DOID associated with the command. Several indexing technologies are used to achieve rapid retrieval. The metadata management element 316 sets a READ flag in the column 555 and returns a storage ID in the column 553 and an address in storage in the column 554 to the data access client element 314.

If a WRITE command is received, the metadata management element 316 receives the WRITE command regarding an existing data and searches an entry in the metadata table 406 by using a DOID associated with the command. A WRITE flag is set in the column 555. A storage ID in the column 553 and an address in storage in the column 554 are returned to the data access client element 314. If the metadata management element 316 receives a WRITE command with new data, a new entry will be created in the metadata table 406, a new DOID and a new location for the new data will be assigned. In order to assign a new DOID, digital signature or fingerprinting technologies are used.

The metadata management element 316 manages free storage spaces in the whole system and assigns new storage locations. It is unique for the architecture 300 that the WRITE command allows a candidate storage location as a parameter, which is mainly asked by the hierarchical storage management element 322.

Referring back to FIG. 4, a data value calculation module 410 stores the data values in a data values table 412. FIG. 6 illustrates an example for the data values table 412.

The data values table 412 includes columns of data object ID 651, data object profiles 652, access record 653, and data value 654.

The column 651 indicates a data object ID for each data object therein, specifying a number for the data object, e.g., "2".

The column 652 indicates the data object profiles, describing a feature of the data object itself, e.g., "G, I, K, L, N, P, Q". Examples of data object profiles are indexes (structured data), or bibliographic information, such as author, title, keywords, production date and so on (semi-structured data), or every word extracted from the data (unstructured data). In order to extract words form unstructured data, indexing technologies similar to those used by Internet search engines are adopted.

The column 653 features the data access records (7) ACS received from the metadata management element 316. In the architecture 300, a number in the column 653 means how many times the data has been accessed. In another possible embodiment of the present invention, an access record in the column 653 indicates several sub-classes of command types. In this particular case, the metadata management element 316 also classifies access records by command types.

The column 654 indicates data values defined by the data value calculation module 410. The easiest way to calculate data values is to assume that access records in the column 653 are the data values in the column 654. However, another embodiment of the present invention calculates the data values by considering smaller data granularity (i.e. data profiles) within the data, e.g., a data object lifetime (discussed later), to reflect users' interest.

Rows 661 to 664 of the data values table 412 are examples of data values entries.

In one embodiment of the present invention, the system presents the data value table 412 to users such that the users can make entries in the table or modify them.

In another embodiment of the present invention, the data values table 412 contains an entry regarding a data creation time, that indicates the time when the data object is initially stored in the system. Using this entry, the data value management element 320 takes into account the data object lifetime and assigns it as the data's value. For example, if the data's lifetime is within a certain period of time, e.g., thirty year, the data value management element 320 considers that the value of the data object is very high and sets the highest value in the column 654 as "25", no matter what is indicated by a respective access record in the column 653. The data value element 320 incorporates the lifetime of the data object to the data value in the column 654 calculated bases on the respective access record in the column 653.

A user interest table 270 records the composite access for each profile parameter. FIG. 7 illustrates an example of the user interests table 270.

The user interest table 270 includes the following types of data in columns: profile parameter 771, index to data object 772, and point 773.

The column 771 indicates a profile parameter for each user profile parameter score entries. Each user profile parameter, such as "B" in the row 661 of FIG. 6, listed in the data object profiles in the column 652 of the data values table 412, such as "B" in a row 782 of FIG. 7, corresponds to an entry in the user interest table 270.

The column 772 indicates the index to data objects that contain the profile parameter in the column 771. This index is a data object ID (DOID). The parameters "A" and "B" are contained in the data object identified as DOID "1" in the row 661 of FIG. 6, a parameter "L" is contained in the data objects identified as DOIDs "2", "3", and "n" in the rows 662, 663, 66n of FIG. 6, and a parameter "M" is contained in data object identified as the DOID "3" in the row 663 of FIG. 6.

The column 773 indicates a point which is a composite access record for each profile parameter. For example, the parameters "A" "B" are contained only in the data object identified as DOID "1", so their points are the same: 4, the access record in the column 653 of FIG. 6. Meanwhile, the parameter "L" is contained in the data objects identified as DOIDs "2", "3", and "n", so the access records of the data objects of DOIDs "2", "3", and "n" in the column 653 of FIG. 6 are summed up into a corresponding point 26 (=0+13+10).

Rows 781 to 784 of the user interests table 270 are examples of profile parameter score entries.

Based on users' recent actual access records, the user interests table 270 reflects the users' current interest. In another embodiment of the present invention, the system presents the user interests table 270 to the users for the users to modify it.

Figure 10:
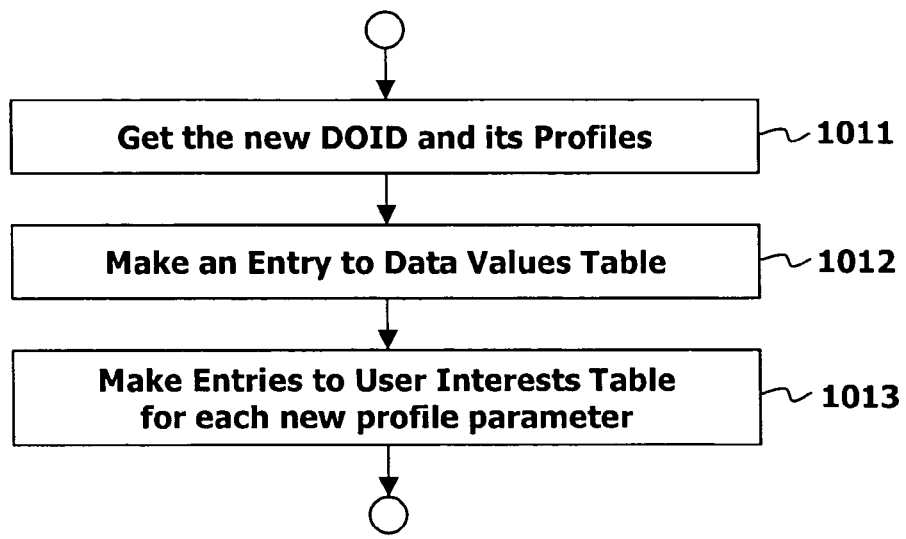
FIG. 10 illustrates a flow chart for the data value management component depicted in FIG. 3 adding a new entry into the data values table.

FIG. 10 shows the process flow through which data value management element 320 adds a new entry into the data values table 412. The process flow contemplates the following steps.

In a step 1011, the data value management element 320 obtains a new DOID and its profiles. When the data value management element 320 finds the new DOID in data access records received from the metadata management element 316, the data value management element 320 asks the metadata management element 316 to send its profiles. Instead of asking the metadata management element 316 to send information about a new data object on demand, the data value management element 320 may directly access the data object and creates data profiles by itself.

During a step 1012, an entry is made into the data values table 412. The data value management element 320 makes an entry regarding the received data object into the data values table 412 and sets a data object ID in the column 651 and data object profiles in the column 652 of FIG. 6. The respective fields in the columns 653 and 654 remain blank until the data values calculation module 410 operates.

In a step 1013, entries are made to the user interest table 270 for each new profile parameter. The data value management element 320 enters the profile parameters received in the step 1011 into the user interests table 270 illustrated by FIG. 7. Also, the data value management element 320 inserts the indexes to data objects to the column 772 of FIG. 7. The field in the column 773 remains blank until the data values calculation module 410 operates.

If entries were deleted from the metadata table 406, the data value management element 320 requests all DOIDs from the metadata table 406, compares them to the data values table 412, and finds and deletes entries corresponding to the deleted DOIDs to keep consistency between the metadata table 406 and the data value table 412. As to the user interest table 270, deleting therefrom profile parameters that are only contained in the deleted data depends on each implementation. Since this embodiment of the present invention is mostly used for archiving, deleting data objects rarely occurs.

Figure 11:
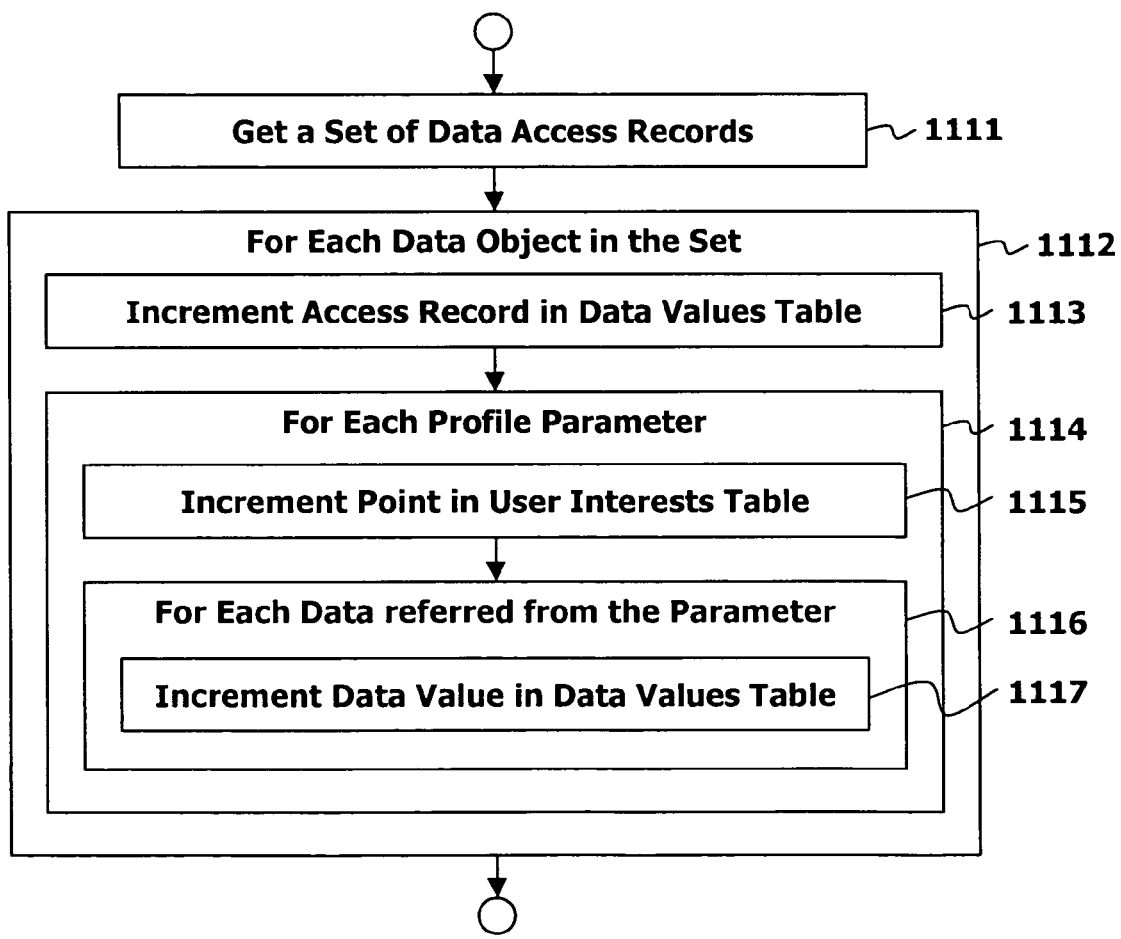
FIG. 11 illustrates a flow chart for data value calculation.

Generally speaking, the data value calculation module 410 operates according to a predefined schedule to avoid performance bottlenecks so as to fill the column 654 of the data value table 412 illustrated by FIG. 6. FIG. 11 shows the process sequence for data value calculation. The process consists of steps 1111 and 1112, that in turn consist of sequence of steps 1113 to 1117.

During the step 1111, the set of data access records (7) ACS are obtained. The data value calculation module 410 in data value management element 320 receives the set of data access records (7) ACS obtained from the metadata management element 316. It is unique in this embodiment that the metadata management element 316 has an interface (protocols or commands) that answers the above requests from the data value management element 320.

In the step 1112, the data value of any data object of interest in data values table is incremented. For each data object, the data value calculation module 410 executes the sequence of steps 1113 through 1117. In the step 1113, the data value calculation module 410 increments a respective access record in the column 653 in the data values table 412 with the value of the access records. In the subsequent step 1114, for each profile parameter of the data object continued in the respective data object profiles in the column 652 of FIG. 6, the data value calculation module 410 executes the steps 1115 through 1117. In the step 1115, the data value calculation module 410 increments a respective point in the column 773 in the user interests table 270 illustrated in FIG. 7 with the value of the access record in the set of data access records (7) ACS. In the step 1116, for each data referred from a profile parameter, the data value calculation module 410 increments a data value in the column 654 of the data values table 412 with the value of the access record of the set of data access records (7) ACS. As such, the access records are incorporated into the users interests table 270 and the data values table 412. The value of the access record may be weighted with access frequency of a data object with its access frequency so as to distinguish the user's interest for a data object accessed 10 time in last month and for another data object accessed 10 time in last week.

In another embodiment of the present invention, the data value calculation module 410 calculates the lifetime of the data objects and adds extra values to the data values depending on the calculated lifetime. For example, the data value calculation module 410 might assume that data objects, which have shorter lifetimes, have more value than objects which have longer lifetime.

FIG. 8 illustrates an example of the storage profiles table 420 of FIG. 4.

The storage profiles table 420 includes the following types of data in columns: storage ID 851, address area 852, storage area value 853, and others 854.

The column 851 indicates the storage ID that identifies a unique storage ID in the whole system. For example, T1 identifies the online storage device 324, T2 identifies the near-line storage device 326, and T3 identifies the offline storage device 328, illustrated in FIG. 4.

The column 852 indicates the address area in which all storage addresses have the same associated cost. In the example illustrated by a row 861, an address area 1 through 100 in a storage ID T1 has the same associated cost/value 10. The column 853 indicates the storage cost/value. A storage cost/value constitutes one of the storage profiles.

The column 854 indicates other features that describe the storage profiles. Examples of such other features include the average performance result information, reliability information, etc. In this particular embodiment of the invention, the information is used to define storage cost. In another embodiment of the present invention, instead of storage cost, the information is used to expand the granularity of storage profiles.

The information contained in rows 861 through 866 are examples of storage profiles. The cost of storage in the online storage devices 324 is the highest, the near-line storage devices 326 are moderately expensive, and the offline storage devices 328 are the least expensive. It is noted that several areas within the same storage device can have different storage costs.

In order to compare and normalize data values and storage costs, the data value table 412 and the storage profiles table 420 are merged into a joined table 150. FIG. 9 illustrates an example of the joined table 150.

The joined table 150 includes the following types of data in columns: data object ID 981, data value 982, normalized data value 983, storage ID 984, address in storage 985, storage area value 986, appropriate storage cost 987, and relocation required 988.

The column 981 indicates a data object ID for each data object therein. The data object ID links the tables 406, and 412, and the storage ID links the tables 406 and 420. The column 982 indicates data values. This information is illustrated in the data value table 412.

The column 983 indicates normalized data values. The information contained by the column 983 is newly calculated and it will be compared with a storage area value 986. The easiest way to normalize data value is by using the maximum data value. However it is important to set a range for data values to be the same as the range for the storage cost/value, in order to compare them.

Columns 984 and 985 indicate storage IDs and addresses respectively. The storage ID information in the column 553 of metadata table 406 corresponds to those in the column 851 of the storage profiles table 420. This information allows for joining the storage profiles table 420 with the metadata table 406. Also, the storage address area information in column 554 in the metadata table 406 corresponds to the information in column 852 of the storage profile table 420, and further corresponds to the information in the column 985 of the joined table 150. This information allows for adding storage area value 986. For each entry in Table 406 (FIG. 5), identical storage IDs are found in the Table 420 (FIG. 8) and then, matched storage areas are also found. For example, the row 561 has a storage ID T2 and address 300 in Table 406 (FIG. 5), which matches to with those of in the row 864 in Table 420 (FIG. 8).

The column 986 indicates storage costs/values. This information is specific to the storage profiles table 420. If other storage profiles are used for comparison with data values, these profiles are selected from the storage profiles table 420, as well.

The column 987 indicates what are the appropriate storage costs for each data object based on its assessed value. The cost is usually defined from the normalized data value 983, and in this example, they are identical.

The column 988 indicates whether the data object should be relocated or not, as a result of the normalization. "YES" means that the data should be relocated, as a result of consideration given to the balance between the value of the data and the cost of the current storage location. "NO" means that the data does not have to be relocated, being stored into an appropriate location, as the balance indicates. If the storage area value in the column 986 and the appropriate storage costs in the column 987 are different, the program identifies that the data is not located in an appropriate area, and the relocation required 988 will be set to "YES"; otherwise, "NO" (as the storage area value 986 and the appropriate storage cost are the same). For example, the data in row 991 should be located at the storage area whose cost is "2", but now is located in the area whose value is "6", so it should be reallocated.

In another embodiment of the present invention, the column 986 and the column 987 are determined to be balanced if their difference falling in a proper range, instead of exact matching. In yet another embodiment of the present invention, the storage area value 986 and the appropriate storage cost 987 are normalized with ranks, and then compared with each other. If the ranks are different, the relocation required 988 will become "YES."

The purpose of the metadata adjustment planning module 416 is to fill out the information in the columns 987 and 988. The metadata adjustment execution module 418 operates data relocation also based on these columns. If the column 988 is Yes, then the data object will be relocated to the storage area whose value is the same as the column 987.

The information contained in rows 991 through 993 are examples of entries of the joined table 150.

Figure 12:
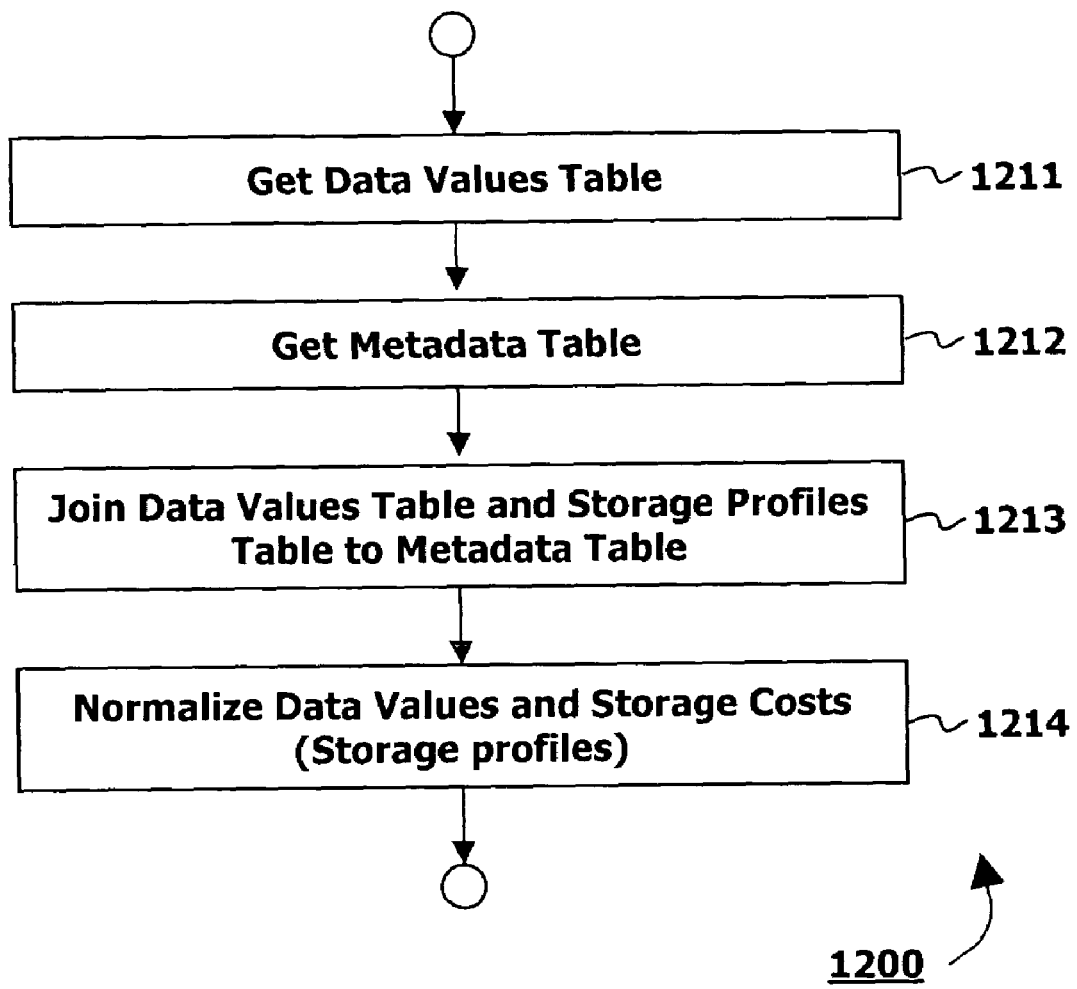
FIG. 12 illustrates a process of planing metadata adjustment performed by a hierarchical storage management component depicted in FIG. 4.

FIG. 12 illustrates a process flow 1200 of planning metadata adjustment performed by the metadata adjustment planning module 416. As mentioned earlier, it is advisable but not required that the metadata adjustment planning module 416 operates according to a predefined schedule to avoid performance bottlenecks.

The process flow 1200 includes steps 1211 through 1214: receiving the data values table in the step 1211, receiving the metadata table in the step 1212, joining data values table and storage profiles table to metadata table in the step 1213, and normalizing data values and storage costs (storage profiles) in the step 1214.

In the step 1211, the metadata adjustment planning module 416 receives the data values table 412 from the data value management element 320.

In the step 1212, the metadata adjustment planning module 416 also receives the metadata table 406 from the metadata management element 316.

In the step 1213, the data values table 412 and the storage profiles table 420 are merged into a joined table 150. The metadata adjustment planning module 416 joins the data values table 412 and the storage profiles table 420 to the joined table 150 illustrated in FIG. 9.

In the step 1214, data values and storage costs (storage profiles) are normalized. The metadata adjustment planning module 416 compiles values for the column 987 and the column 988 in the table 150 illustrated in FIG. 9. Because data values will be normalized to fit in the range of the storage cost/value, the metadata adjustment planning module 416 copies them to the appropriate storage cost fields in the column 987. If the appropriate storage costs in the column 987 and the current storage costs in the column 986 are different, the metadata adjustment planning module 416 sets "YES" into a column relocation required field in the column 988. Otherwise, it sets "NO" in the column 988.

There are several possible ways to set values in the column 987. One possibility is to sort all entries from the joined table 150 illustrated by FIG. 9 first by normalized data value in the column 983, and then to allocate the appropriate storage costs in the column 987 in a predefined sequential order.

Before the hierarchical storage management element 322 proceeds to the metadata adjustment execution module 418, users may want to confirm and modify the relocation plan. The metadata adjustment planning module 418 shows the content table illustrated in FIG. 9 as requested by users and supports viewing and editing the relocation plan. The interfaces required to perform these functions are not discussed in details as they are know to one skilled in the art.

A process flow of metadata adjustment 1400 is performed by the metadata adjustment execution module 418. Generally speaking, the metadata adjustment execution module 418 operates according to a predefined schedule to avoid performance bottleneck.

During steps 1411–1418, the metadata adjustment execution module 418 executes each step by an entry that is set as "YES" in the column 988 of FIG. 9.

In the step 1411, the metadata adjustment execution module 418 sends a "READ" command with a data object ID to the metadata management element 316 and receives in return a storage ID and a storage address. The reason why the module 418 asks for the storage ID and the storage address again instead of using as they are already contained in table of FIG. 9 is because it is possible that some clients may modify the data location during the execution of the metadata adjustment execution module.

In the step 1412, the metadata adjustment execution module 418 compares the received storage ID and the received storage address with the ones from the table of FIG. 9. If they are not the same, but if the storage cost associated with the received storage ID and the storage address is the same as the respective appropriate storage cost in the column 987 found in the joined table 150, the metadata adjustment execution module 418 goes back to the step 1411 and proceeds to the next entry. If they are different, then the metadata adjustment execution module 418 proceeds to the next step 1413. In another embodiment, if the addresses are not the same, the metadata adjustment execution module 418 realizes that the data object was moved by the client and that relocation is not appropriate, and then proceeds to the next entry.

In the step 1413, the metadata adjustment execution module 418 reads the data object based upon the received storage ID and the storage address, and saves it temporarily in a buffer.

In the step 1414, the metadata adjustment execution module 418 identifies storage IDs and address areas whose storage costs are the same as the appropriate storage cost in the column 387, using the storage profiles table 420 illustrated in FIG. 8.

In the step 1415, the metadata adjustment execution module 418 sends a "WRITE" command to the metadata management element 316 to find free space in the identified storage IDs and the address areas that are identified during the step 1414. In this case, the metadata management element 316 copies all additional metadata from the current entry to a new entry made in the metadata table 406 illustrated in FIG. 5.

In the step 1416, if the metadata adjustment execution module 418 receives an acknowledgement of failure, it sends a "WRITE" command to neighboring areas of the areas found in the step 1414. The storage cost of the neighboring areas is still the same as the appropriate storage cost in the column 987, or close values if there is no space having the same cost. The operation is repeated until it receives an acknowledgement of success.

In the step 1417, the metadata adjustment execution module 418 retrieves the data in the buffer and write it to the storage ID and address received with the acknowledgement of success.

In the step 1418, the metadata adjustment execution module 418 sends a "RELEASE" command to the metadata management element 316 in order to set the released entry in the metadata table 406 illustrated in FIG. 5 to free space to be available for other data objects.

In a different embodiment of the present invention, the metadata adjustment execution module 418 sends a special "WRITE" command asking the metadata management element 316 to find a space, including neighborhood areas of the found area, instead of executing steps 1415 and 1416. This means that the metadata management element 316 finds a space, whose value is within an appropriate range from the appropriate storage cost in the column 987, instead of the exact storage cost.

In yet another embodiment, if the current storage ID and the new storage ID received in the step 1412 are the same, the metadata adjustment execution module 418 simply asks the storage device to migrate the data object to the appropriate address within the storage device, instead of reading into a buffer.

The methods of the present invention can be performed using a different embodiment of hierarchical storage management apparatus, such as the RAIN architecture.

Figure 13:
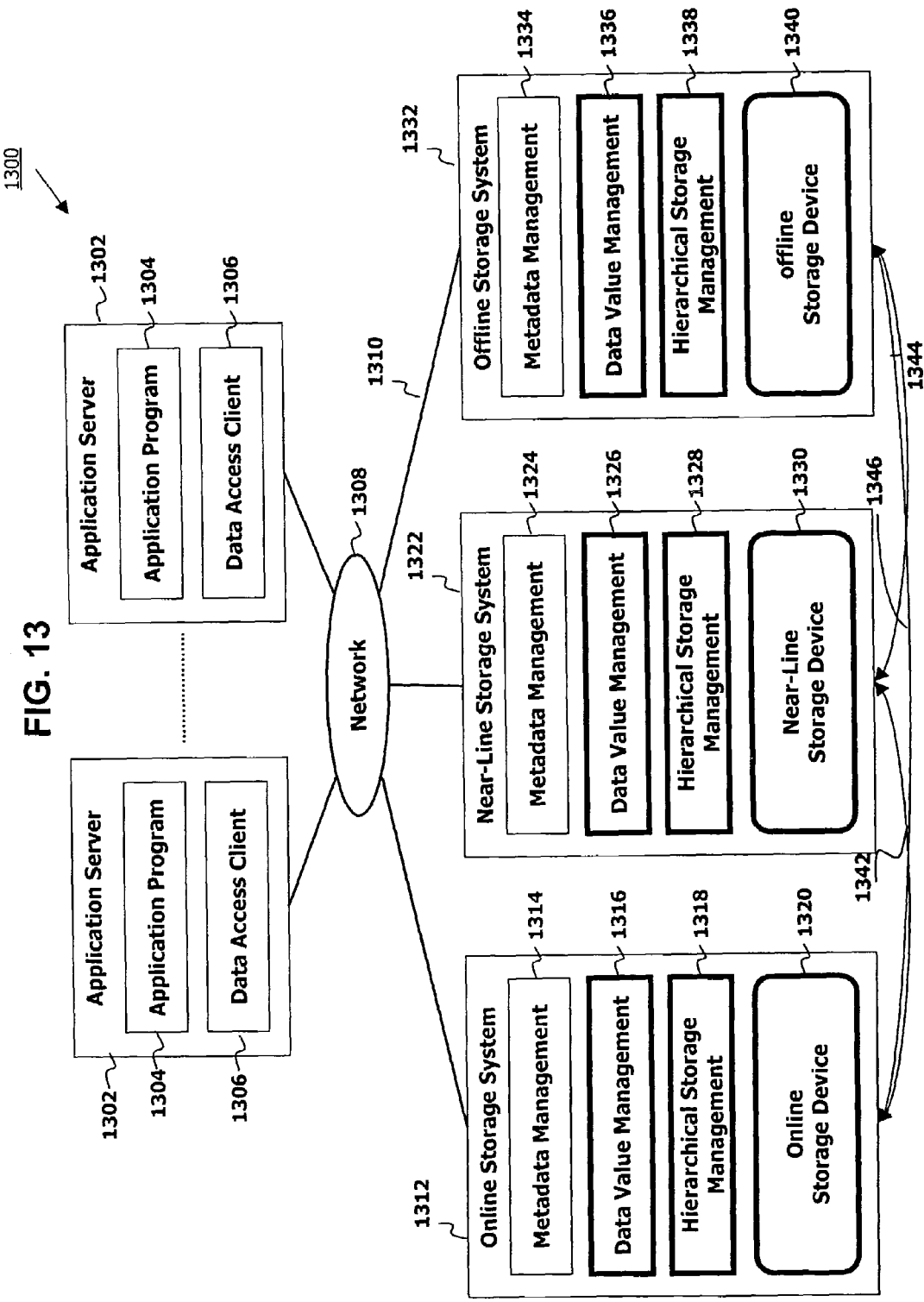
FIG. 13 illustrates a block diagram of a hierarchical data management apparatus, in accordance a second embodiment of the present invention.
Figure 14:
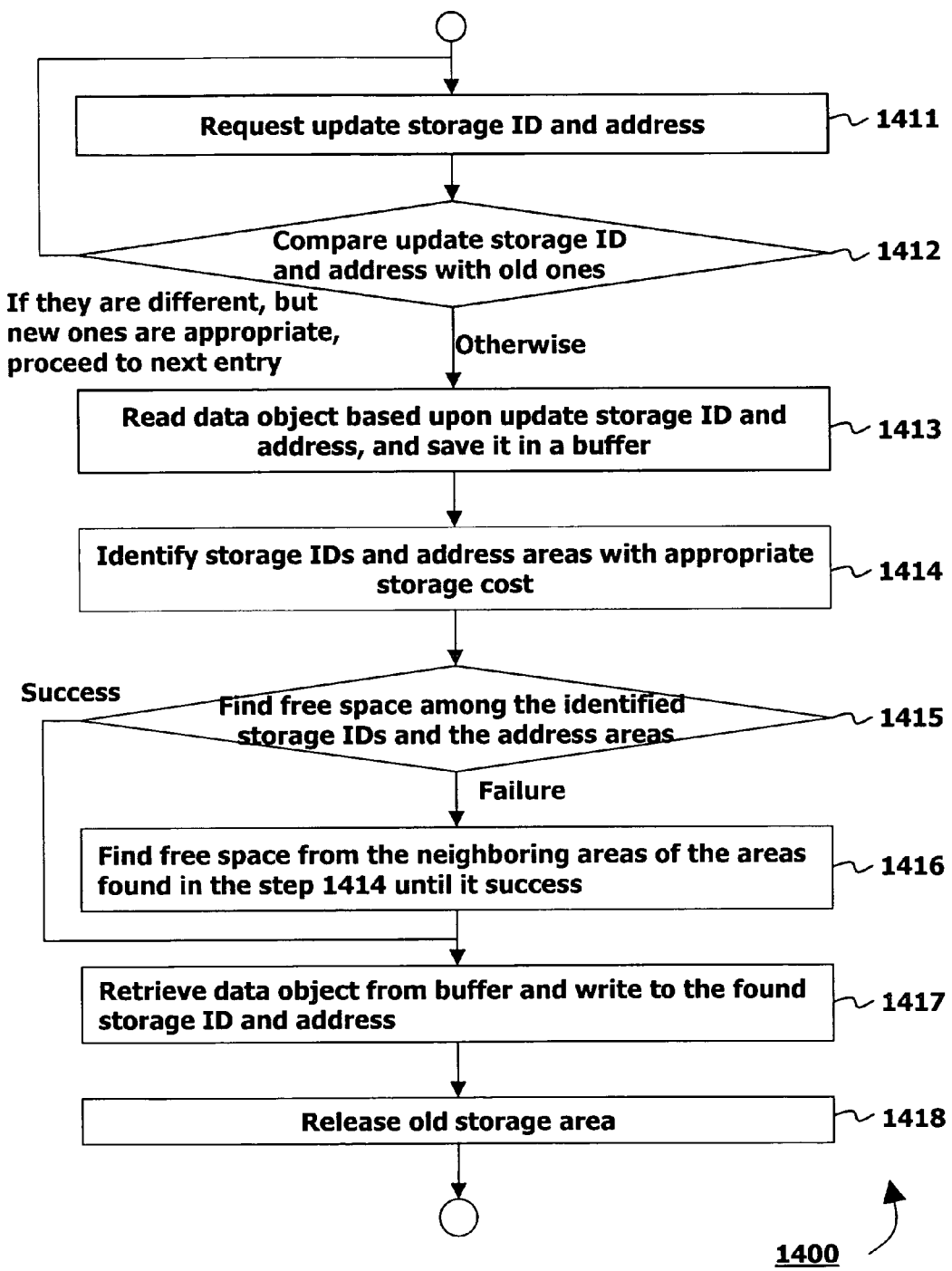
FIG. 14 illustrates a flow chart for metadata adjustment.

FIG. 13 illustrates a block diagram of a hierarchical data management apparatus, in accordance with a second embodiment of the present invention.

The hierarchical data management apparatus 1300 illustrated in FIG. 13 comprises a plurality of application servers 1302, a network 1308, and a plurality of storage systems connected into the network and interconnected among themselves by data flow lines 1310.

Each of the plurality of application servers 1302 in the network comprises an application program element 1304 and a data access client element 1306. The plurality of storage systems includes different types of storage systems, such as online storage systems 1312, near-line storage systems 1322, and offline storage systems 1332. The online storage systems 1312 include metadata management units 1314, data value management units 1316, hierarchical storage management units 1318, and online storage devices 1320. The near-line storage systems 1322 include metadata management units 1324, data value management units 1326, hierarchical storage management units 1328, and near-line storage devices 1330. The offline storage systems 1332 include metadata management units 1334, data value management units 1336, hierarchical storage management units 1338, and offline storage devices 1340. The plurality of application servers 1302 and the plurality of storage devices are connected to the network 1308 using command flow lines. The storage devices 1320, 1330, and 1340 are interconnected through data flow paths 1342, 1344, and 1346. These lines are illustrated in FIG. 13 by the data flow lines 1310 which indicate conceptual data flow lines between the storage devices. The real data flow is executed through the network 1308.

The main difference between the hierarchical storage management apparatus illustrated by FIG. 3 and the one illustrated by FIG. 13 is that each of the online, near-line or offline storage system in FIG. 13 contains an internal metadata management unit, an internal data value management unit, and an internal hierarchical storage management unit, incorporated therein, rather than exchanging data externally with those units in a separate metadata server 304 via the storage area network (SAN) or the network attached storage (NAS) 308 as shown in FIG. 3.

Metadata management units (1314, 1324 or 1324) manage metadata of data contained within their own storage system. If a metadata management unit within a storage system cannot find a particular data object requested by a user/client, it passes on the request to other storage systems that may contain the data object.

Data value management units (1316, 1326, or 1326) manage data values of data objects contained within their own storage system. The method by which the data value is calculated is the same as with the first embodiment of the invention and is also based on data access records.

Hierarchical storage management units (1318, 1328, or 1338) normalize each data value and assign it with an appropriate storage cost using the same method as used by the first embodiment of the invention. The hierarchical storage management units know the range of storage costs to be managed within each storage device. If the appropriate storage cost is within the range, the hierarchical storage management unit adjusts the metadata using the same method as described in the first embodiment. Otherwise, the hierarchical storage management unit asks other storage systems that may cover the storage cost to migrate and save the data object.

An unique feature for the second embodiment of the invention is that metadata management units not only ask which data objects (DOIDs) each child-node contains, but also ask which storage costs each child-node covers.

The present invention is not, however, limited to be applied within storage networks. Based on the description herein, one skilled in the art(s) will understand that the invention can be implemented in other environments.

Further, while various embodiments of the present invention have been described above, it should be understood that they have been presented by way of example, and not limitation. It will be apparent to persons skilled in the relevant art that various changes in form and detail can be made therein without departing from the spirit and scope of the invention.

In addition, the present invention has been described above with the aid of functional blocks and relationship thereof. The boundaries of these functional building blocks and method steps have been arbitrarily defined herein for the convenience of the description. Alternate boundaries can be defined so long as the specified functions and relationships thereof are appropriately performed. Any such alternate boundaries ate thus within the scope and spirit of the claimed invention. One skilled in the art will recognize that these functional blocks can be implemented by discrete components, application specific integrated circuits, processors executing appropriate software and the like or any combination thereof, as was described above in connection with FIG. 12 and 13, for example. Thus, the breath and scope of the present invention should not be limited by any of the above described exemplary embodiments, but should be defined only in accordance with the following claims and their equivalents.

What is claimed is:

1. A hierarchical storage data management system, comprising:
   a plurality of application servers;
   a metadata server interconnected with said plurality of application servers through a local area network;
   a plurality of storage devices being interconnected through a plurality of data flow paths; and
   a storage network connecting said plurality of storage devices to said plurality of application servers and to said metadata server,
   wherein said metadata server comprises a metadata management element, a data value management element for assigning a data value to each of a plurality of data objects of a user corresponding to interest of the user, and a hierarchical storage management element,
   wherein said data value management element includes: means for receiving a plurality of user interest indicators for a plurality of data objects from said metadata management element; means for analyzing said plurality of user interest indicators; means for determining a user interest level for each of said data objects; and means for assigning to each of said data objects a data value corresponding to said user interest level,
   said user interest indicators include bibliographic information, words extracted from said data object and an assigned lifetime value of said data object as assigned by the user with respect to a lifetime of said data object from being stored to deleted,
   wherein said hierarchical storage management element includes: means for receiving a plurality of storage cost indicators from said metadata management element; means for analyzing said plurality of storage cost indicators; means for determining a storage cost level for each of a plurality of storage areas in said storage devices; means for assigning to said each storage area a storage cost value corresponding to said storage cost level, means for planning metadata adjustment by balancing between said storage cost values and metadata values assigned to metadata objects, and means for adjusting storage areas of said metadata objects as planned by said means for planning metadata adjustment,
   said storage cost indicators include average performance and reliability of said each storage area, and
   wherein said metadata server normalizes assigned data values by said data value management element and assigned storage cost values by said hierarchical storage management element by setting a range of the assigned data values to be identical with a range of the assigned storage cost values, and compares normalized data values with normalized storage cost values to determine whether to relocate data objects to different storage areas.

2. The hierarchical storage data management system according to claim 1, wherein said plurality of storage devices comprises at least one of
   a plurality of online storage devices,
   a plurality of near-line storage devices, and
   a plurality of offline storage devices.

3. The hierarchical storage data management system according to claim 2, wherein said storage cost value decreases depending upon that said each storage area is located in an online storage device, a near-line storage device, or an offline storage device.

4. The hierarchical storage data management system according to claim 1, wherein the application servers are inter-connected through the local area network, the application servers access the storage devices through the storage network, a link is established between the storage network and each of the storage devices.

5. The hierarchical storage data management system according to claim 1, wherein each of the storage devices has links to directly access other storage devices, said each of the storage devices manages metadata therein and accesses other storage devices if requested data are not available therein.

6. The hierarchical storage data management system according to claim 1, wherein said hierarchical storage management element stores or relocates said data objects into a plurality of storage areas in said plurality of storage devices based on said data values and a storage profile pertaining to each of said storage areas.

7. The hierarchical storage data management system according to claim 1, wherein said user interest indicators include a user's data access records of said data object.

8. The hierarchical storage data management system according to claim 7, wherein said user's access records are numbers of access times provided for a pre-determined time period or a lifetime of said data object from being stored to deleted.

9. The hierarchical storage data management system according to claim 8, wherein said numbers of access times are weighted with access frequency.

10. The hierarchical storage data management system according to claim 7, wherein said user's access records are classified by a plurality of command types, and said data value is a sum of said user's access records of some or all of said command types.

11. The hierarchical storage data management system according to claim 7, wherein the metadata management element has an interface that answers requests for said data access records from the data value management element.

12. The hierarchical storage data management system according to claim 1, wherein said user interest indicators include indexes.

13. The hierarchical storage data management system according to claim 1, wherein said bibliographic information includes author, title, keywords, and production date.

14. The hierarchical storage data management system according to claim 1, wherein said metadata server uses the maximum data value of said data values as a maximum value for the storage cost values.

15. The hierarchical storage data management system according to claim 1, wherein said metadata server uses the maximum storage cost value of said storage cost values as a maximum value of said data values.

16. A hierarchical storage data management method, comprising:
provinding a plurality of data objects and a plurality of storage areas in storage devices connected via a storage network;
calculating a data value for each of the data objects thereby assigning the data value to each of the data objects of a user corresponding to interest of the user, the calculating step involving: collecting a plurality of user interest indicators; analyzing said plurality of user interest indicators; determining a user interest level for each of said data objects; and assigning to each of said data objects a data value corresponding to said user interest level;
assigning a storage cost value for each of the storage areas, the assigning step involving: collecting a plurality of storage cost indicators; analyzing said plurality of storage cost indicators;
determining a storage cost level for each of said storage areas; and assigning to each of said storage areas a storage cost value corresponding to said storage cost level;
normalizing calculated data values and assigned storage cost values to an identical value range;
comparing normalized data values with normalized storage cost values thereby determining whether to relocate said data objects to different storage areas;
relocating data objects to storage areas with storage cost values identical with data values of said data objects;
planning metadata adjustment by balancing between said storage cost values and metadata values assigned to metadata objects; and
adjusting storage areas of said metadata objects as planned by said means for planning metadata adjustment,
wherein the collecting step in the calculating step involves collecting bibliographic information, words extracted from said data object and an assigned lifetime value of said data object as assigned by the user with respect to a lifetime of said data object from being stored to deleted, and
wherein the collecting step in the assigning step involves collecting data of average performance and reliability of each of said storage areas.

17. The hierarchical storage data management method according to claim 16, wherein the collecting step involves collecting indexes.

18. The hierarchical storage data management method according to claim 16, wherein said bibliographic information includes author, title, keywords, and production date.

19. The hierarchical storage data management method according to claim 16, wherein the assigning step involves decreasing said storage cost values depending upon each of said storage areas is located in an online storage device, a near-line storage device, or an offline storage device.

20. The hierarchical storage data management method according to claim 16, wherein the normalizing step involves using the maximum data value of said data values as a maximum value for the storage cost values.

21. The hierarchical storage data management method according to claim 16, wherein the normalizing step involves using the maximum storage cost value of said storage cost values as a maximum value of said data values.

22. The hierarchical storage data management method according to claim 16, wherein the collecting step in the calculating step involves adding numbers of access times provided for a pre-determined time period or a lifetime of each of said data objects from being stored to being deleted.

23. The hierarchical storage data management method according to claim 22, wherein access to each of said data objects includes a plurality of command types for access, and each of said data values is a sum of said numbers of access times of some or all of said command types.

24. The hierarchical storage data management method according to claim 22, wherein said numbers of access times are weighted with access frequency.

* * * * *